US008732042B2

(12) United States Patent  (10) Patent No.: US 8,732,042 B2
Hammad et al.  (45) Date of Patent: May 20, 2014

(54) MOBILE DATA MAPPING SYSTEM AND METHOD

(75) Inventors: Ayman Hammad, Pleasanton, CA (US); Prakash Prem Hariramani, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 13/561,983

(22) Filed: Jul. 30, 2012

(65) Prior Publication Data

US 2013/0198046 A1  Aug. 1, 2013

Related U.S. Application Data

(60) Provisional application No. 61/512,649, filed on Jul. 28, 2011.

(51) Int. Cl.
*G06Q 40/00*  (2012.01)

(52) U.S. Cl.
USPC ............ 705/30; 705/14; 705/26.1; 705/35; 705/38; 705/67; 455/466; 235/379; 380/258; 707/600

(58) Field of Classification Search
USPC .......... 705/30, 14, 26.1, 35, 38, 67; 455/466; 235/379; 380/258; 707/600, 607
See application file for complete search history.

(56) References Cited

U.S. PATENT DOCUMENTS

| | | | | |
|---|---|---|---|---|
| 7,403,922 | B1 * | 7/2008 | Lewis et al. | 705/38 |
| 8,244,629 | B2 * | 8/2012 | Lewis et al. | 705/38 |
| 2003/0169881 | A1 * | 9/2003 | Niedermeyer | 380/258 |
| 2005/0071671 | A1 * | 3/2005 | Karaoguz | 713/200 |
| 2005/0133588 | A1 | 6/2005 | Williams | |
| 2005/0149430 | A1 * | 7/2005 | Williams | 705/38 |
| 2006/0069585 | A1 | 3/2006 | Springfield et al. | |
| 2008/0177662 | A1 | 7/2008 | Smith et al. | |
| 2008/0191007 | A1 | 8/2008 | Keay | |
| 2008/0222038 | A1 | 9/2008 | Eden et al. | |
| 2009/0187492 | A1 | 7/2009 | Hammad | |
| 2009/0254476 | A1 | 10/2009 | Sharma et al. | |
| 2009/0328052 | A1 | 12/2009 | Nguyen | |
| 2010/0019025 | A1 | 1/2010 | Wang et al. | |

(Continued)

FOREIGN PATENT DOCUMENTS

| KR | 20000063874 A | 11/2000 |
|---|---|---|
| KR | 20030031087 A | 4/2003 |

(Continued)

OTHER PUBLICATIONS

International Search Report and Written Opinion mailed Dec. 14, 2012, PCT/US2012/048868, 8 pages.
U.S. Appl. No. 61/393,753, filed Oct. 15, 2010, entitled "Application of Location Based Information to Transaction Processing," 20 pages.

*Primary Examiner* — Vanel Frenel
(74) *Attorney, Agent, or Firm* — Kilpatrick Townsend & Stockton LLP

(57) ABSTRACT

Embodiments of the invention are related to systems and methods for analyzing transaction data for mobile merchant transactions, and generating a message based on the analysis. Transaction data for one or more transactions conducted at one or more mobile merchants is electronically received, the transaction data including a location for each of the one or more transactions. The transaction data is analyzed by a server computer which generates a message based on the analysis, the message being transmitted to a client device.

29 Claims, 11 Drawing Sheets

(56) References Cited

U.S. PATENT DOCUMENTS

| | | |
|---|---|---|
| 2010/0063903 A1* | 3/2010 | Whipple et al. ............... 705/30 |
| 2010/0138338 A1 | 6/2010 | Hammad et al. |
| 2010/0138345 A1 | 6/2010 | Lekhtman et al. |
| 2010/0274597 A1 | 10/2010 | Dill |
| 2011/0093351 A1 | 4/2011 | Afana |
| 2012/0094639 A1* | 4/2012 | Carlson et al. ............. 455/414.1 |

FOREIGN PATENT DOCUMENTS

| | | |
|---|---|---|
| WO | 01/41093 A1 | 6/2001 |
| WO | 2007/004224 A1 | 1/2007 |
| WO | 2009/082369 A1 | 7/2009 |

* cited by examiner

ENROLLMENT DATA TABLE
300

| Mobile Merchant ID 300(a) | Region 300(b) | Report Types 300(c) | Report Frequency 300(d) | Report Format 300(e) | Alert Types 300(f) | Alert Format 300(g) |
|---|---|---|---|---|---|---|
| 123456 | San Francisco Bay Area, CA | A, B, C | Monthly | E-Mail | W | SMS |
| 789101 | Manhattan, NY | A, B | Daily | SMS | W, X, Y | E-Mail |
| 121314 | Los Angeles, CA | | | | X, Y, Z | SMS |
| 151617 | East San Francisco Bay, CA | C, D | Hourly | Dashboard | X, Y | E-Mail |
| 181920 | North San Francisco Bay, CA | C, D, E | Daily | E-Mail | | |
| 202122 | San Francisco, CA | A, B | Weekly | Dashboard | Y, Z | E-Mail |
| 232425 | Oakland, CA | | | | X, Y, Z | SMS |
| 262728 | San Francisco Bay Area, CA | A, B, C | Daily | E-Mail | Z | E-Mail |

FIG. 3

TRANSACTION DATA TABLE
400

| Mobile Merchant ID 400(a) | Date/Time 400(b) | Location 400(c) | Authorization Amount 400(d) | Authorization Category 400(e) | Fraud 400(f) |
|---|---|---|---|---|---|
| 123456 | 6/23/12 - 11:30 | San Francisco, CA - Civic Center Plaza | $5.26 | Approved | N |
| 789101 | 6/23/12 - 11:32 | Oakland, CA - Jack London Square | $7.32 | Declined | N |
| 121314 | 6/23/12 - 11:33 | San Francisco, CA - Golden Gate Park | $23.33 | Chargeback | Y |
| 123456 | 6/23/12 - 11:34 | San Francisco, CA - Civic Center Plaza | $15.45 | Approved | N |
| 151617 | 6/23/12 - 11:36 | San Francisco, CA - Fort Mason | $8.22 | Approved | N |
| 181920 | 6/23/12 - 11:37 | Berkeley, CA - Sproul Plaza | $10.00 | Approved | N |
| 181920 | 6/23/12 - 11:40 | Berkeley, CA - Sproul Plaza | $4.00 | Declined | Y |
| 151617 | 6/23/12 - 11:42 | San Francisco, CA - Fort Mason | $5.75 | Declined | N |
| 212223 | 6/23/12 - 11:43 | San Francisco, CA - Fisherman's Wharf | $42.50 | Chargeback | N |
| 242526 | 6/23/12 - 11:44 | San Francisco, CA - Civic Center Plaza | $8.34 | Approved | N |
| 272829 | 6/23/12 - 11:46 | San Francisco, CA - Fort Mason | $26.26 | Approved | N |

FIG. 4

Transaction Volume by Location Report 500

| Location 500(a) | Date Interval 500(b) | Sales Volume 500(c) | Transaction Count 500(d) | Mobile Merchant Count 500(e) | Sales Volume per Mobile Merchant 500(f) | Transaction Count per Mobile Merchant 500(g) |
|---|---|---|---|---|---|---|
| San Francisco, CA - Civic Center Plaza | 5/1/12 - 5/30/12 | $25,645 | 15,247 | 7 | $3,664 | 2178 |
| Oakland, CA - Jack London Square | 5/1/12 - 5/30/12 | $21,303 | 14,217 | 8 | $2,663 | 1777 |
| San Francisco, CA - Golden Gate Park | 5/1/12 - 5/30/12 | $16,961 | 13,187 | 6 | $2,827 | 2198 |
| San Francisco, CA - Fort Mason | 5/1/12 - 5/30/12 | $12,619 | 12,157 | 7 | $1,803 | 1737 |
| Berkeley, CA - Sproul Plaza | 5/1/12 - 5/30/12 | $8,277 | 11,127 | 5 | $1,655 | 2225 |
| San Francisco, CA - Fisherman's Wharf | 5/1/12 - 5/30/12 | $3,935 | 10,097 | 4 | $984 | 2524 |

FIG. 5

Transaction Volume by Time Report 600

| Location 600(a) | Date Interval 600(b) | Time Interval 600(c) | Sales Volume 600(d) | Transaction Count 600(e) | Mobile Merchant Count 600(f) | Sales Volume per Mobile Merchant 600(g) | Transaction Count per Mobile Merchant 600(h) |
|---|---|---|---|---|---|---|---|
| San Francisco, CA - Civic Center Plaza | 6/22/2012 | 11:00-11:30 | $1,456 | 126 | 6 | $243 | 21 |
| | | 11:30-12:00 | $2,425 | 268 | 7 | $346 | 38 |
| | | 12:00-12:30 | $3,250 | 325 | 7 | $464 | 46 |
| | | 12:30-13:00 | $3,845 | 400 | 7 | $549 | 57 |
| | | 13:00-13:30 | $2,210 | 242 | 6 | $368 | 40 |
| | | 13:30-14:00 | $1,825 | 154 | 4 | $456 | 39 |

Fraud Rate by Location Report
700

| Location 700(a) | Date Interval 700(b) | Transaction Count 700(c) | Fraudulent Transaction Count 700(d) | Fraud Rate 700(e) |
|---|---|---|---|---|
| San Francisco, CA - Civic Center Plaza | 5/1/12 - 5/30/12 | 15,247 | 839 | 5.50% |
| Oakland, CA - Jack London Square | 5/1/12 - 5/30/12 | 14,217 | 721 | 5.07% |
| San Francisco, CA - Golden Gate Park | 5/1/12 - 5/30/12 | 13,187 | 612 | 4.64% |
| San Francisco, CA - Fort Mason | 5/1/12 - 5/30/12 | 12,157 | 512 | 4.21% |
| Berkeley, CA - Sproul Plaza | 5/1/12 - 5/30/12 | 11,127 | 421 | 3.78% |
| San Francisco, CA - Fisherman's Wharf | 5/1/12 - 5/30/12 | 10,097 | 338 | 3.35% |

FIG. 8

Fraud Rate by Time Report
800

| Location 800(a) | Date Interval 800(b) | Time Interval 800(c) | Transaction Count 800(d) | Fraudulent Transaction Count 800(e) | Fraud Rate 800(f) |
|---|---|---|---|---|---|
| San Francisco, CA - Civic Center Plaza | 6/22/2012 | 09:00-09:30 | 114 | 4 | 3.24% |
| | | 09:30-10:00 | 145 | 5 | 3.55% |
| | | 10:00-10:30 | 185 | 8 | 4.20% |
| | | 10:30-11:00 | 202 | 9 | 4.50% |
| | | 11:00-11:30 | 142 | 12 | 8.50% |
| | | 11:30-12:00 | 118 | 11 | 9.00% |

FIG. 9

Fraud Alert Message
900

| Current Location 900(a) | Current Date/Time 900(b) | Fraud Rate 900(c) |
|---|---|---|
| San Francisco, CA - Civic Center Plaza | 6/23/2012 - 11:05 | 8.50% |

US 8,732,042 B2

MOBILE DATA MAPPING SYSTEM AND METHOD

CROSS-REFERENCES TO RELATED APPLICATIONS

This application claims the benefit of U.S. Provisional Application No. 61/512,649, filed Jul. 28, 2011, entitled "FRAUD AND MAPPING," which is herein incorporated by reference in its entirety for all purposes.

BACKGROUND

Mobile merchants are an increasingly prevalent phenomenon. Many traditional merchants (e.g., restaurants, grocery stores, department stores, and the like) are opting to sell goods and services at locations other than their usual place of business. For example, many restaurant owners now operate food trucks in addition to their stationary dining venues. Food trucks are often more cost-effective than restaurants, and the ability to reach customers in numerous locations can provide owners with substantial financial benefit.

Mobile merchants typically "set up shop" at different locations on a day-to-day basis. Consequently, mobile merchants may want to be aware of the specific geographic locations and times of day associated with the greatest revenue potential. Further, mobile merchants may want to be aware of the specific locations associated with a high rate of fraudulent transactions so that such locations can be avoided.

Traditionally, mobile merchants have relied on personal experience to determine when and where to conduct transactions. Such information, however, may be limited to those locations at which the mobile merchant has previously set up shop. Moreover, mobile merchants may be unwilling to conduct transactions at unfamiliar locations out of concern for fraud. As such, mobile merchants may be unaware of profitable opportunities at unfamiliar geographic locations.

Moreover, existing computational solutions to the problem of determining transaction volume and fraud statistics for mobile merchants are inefficient, memory-intensive, and unreliable. For example, mobile merchants can maintain electronic records of their transactions that may be provided by the mobile merchant to a third party data analyst. To produce meaningful transaction volume and fraud statistics, however, electronic transaction records for many mobile merchants that conduct transactions at many locations must be aggregated. Consequently, such electronic transaction records may potentially be received from mobile merchants in disparate data formats. Thus, before analysis can begin, the electronic records must typically be normalized which can be a time-consuming and memory-intensive process. Moreover, since the accuracy of the resulting statistics is highly dependent on the volume of transaction data analyzed, the produced volume and fraud statistics may not accurately reflect the most desirable (or undesirable) geographic locations and times of day.

Embodiments of the invention address the above problems, and other problems, individually and collectively.

SUMMARY

Embodiments of the invention are related to systems and methods for analyzing transaction data for mobile merchant transactions, and generating a message based on the analysis.

One embodiment of the invention is directed to a method comprising electronically receiving transaction data for one or more transactions conducted at one or more mobile merchants, the transaction data including a location for each of the one or more transactions. The transaction data is analyzed by a server computer which generates a message based on the analysis, the message being electronically transmitted to a client device.

Another embodiment of the invention is directed to a server computer comprising a processor and a computer readable medium coupled to the processor. The computer readable medium comprises code executable by a processor for implementing a method comprising electronically receiving transaction data for one or more transactions conducted at one or more mobile merchants, the transaction data including a location for each of the one or more transactions. The transaction data is analyzed, and a message is generated based on the analysis, the message being electronically transmitted to a client device.

Another embodiment of the invention is directed to a method comprising electronically transmitting transaction data for one or more transactions conducted at one or more mobile merchants to a server computer associated with a payment processing network, the transaction data identifying a location for each of the one or more transactions. The server computer analyzes the transaction data for the transaction and generates a message based on the analysis. The message is electronically received at a client device.

These and other embodiments of the invention are described in further detail below with reference to the Figures and the Detailed Description.

BRIEF DESCRIPTION OF THE DRAWINGS

FIG. 3 shows an enrollment data table according to an embodiment of the invention.

FIG. 4 shows a transaction data table according to an embodiment of the invention.

FIG. 5 shows a transaction volume by location report according to an embodiment of the invention.

FIG. 6 shows a transaction volume by time report according to an embodiment of the invention.

FIG. 7 shows a fraud rate by location report according to an embodiment of the present invention.

FIG. 8 shows a fraud rate by time report according to an embodiment of the invention.

FIG. 9 shows a fraud alert message according to an embodiment of the invention.

DETAILED DESCRIPTION

Figure 1:
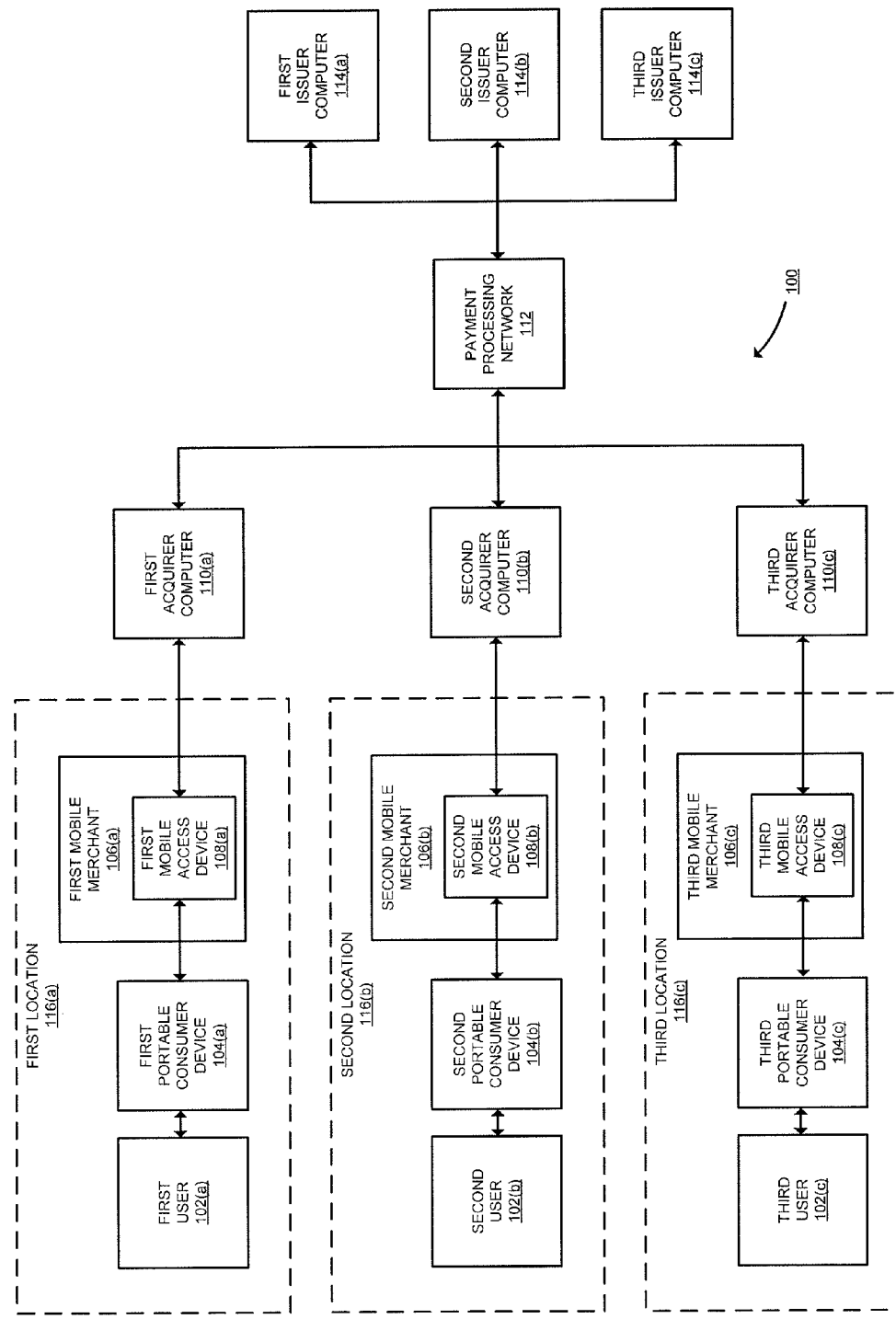
FIG. 1 shows a block diagram of a payment processing system according to an embodiment of the invention.

Prior to discussing embodiments of the invention, a further description of some terms may be helpful in understanding embodiments of the invention.

As used herein, a "mobile merchant" may include an entity that can sell goods and/or services, and that can engage in transactions at different locations. For example, exemplary mobile merchants can include mobile food service providers (e.g., food trucks, food delivery, etc.), door-to-door salesmen, flea market vendors, home service providers (e.g., electricians, carpenters, floor installers, plumbers, gardeners, housekeepers, handymen, etc.), transportation service providers (e.g., taxis, limousines, tow trucks), and any mobile merchants that can engage in transactions at different locations.

As used herein, a "transaction" may refer to an exchange or transfer of goods, services, and/or funds. For example, a transaction may be an exchange between a consumer and a merchant (e.g., a mobile merchant) involving the consumer's purchase of goods and/or services from the merchant.

As used herein, "transaction data" may be data related to one or more transactions as defined above. For example, transaction data can be contained in data messages associated with the processing of an electronic transaction such as an authorization request message, an authorization response message, a clearing message, a settlement message, a chargeback message, or any other suitable electronic message associated with the processing of an electronic transaction. For a given electronic transaction, the corresponding transaction data can include a mobile merchant identifier (e.g., MVV, DBA, access device identifier, etc.), date, time, location of the transaction (e.g., GPS coordinates, address, intersection, monument, landmark, etc.), authorization amount (e.g., the transaction amount submitted for authorization), authorization category (e.g., approved, declined, chargeback, etc.), and other information. Transaction data can also include a unique transaction identifier, transaction class (e.g., credit, debit, prepaid, etc.), acquirer identifier, acquirer processor identifier, issuer identifier (e.g., BIN, etc.), issuer processor identifier, one or more error codes, cardholder or account holder information (e.g., name, date of birth, address, phone number, etc.), card verification value (CVV), expiration date, loyalty account information, and other information associated with the transaction.

In embodiments of the invention, transaction data may also identify a transaction as fraudulent. As used herein, a "fraudulent" transaction may refer to a transaction conducted on an account wherein the holder of the account did not give consent or proper authorization. For example, a "fraudulent transaction" may occur if one attempts to use a stolen account number to conduct a transaction.

As used herein, "transaction volume" may refer to a metric describing the volume of transactions at a selected location and/or time of day. For example, transaction volume can include a transaction count (e.g., a number of transactions), a sales volume (e.g., a revenue amount), a mobile merchant count (e.g., a number of mobile merchants), and any other suitable metric for a selected location and/or time of day.

As used herein, a "message" may refer to a report, alert, or any other electronic communication. In embodiments of the invention, messages can be transmitted in the form of an e-mail, SMS message, instant message, page, telephone call, or any other suitable form of electronic communication.

As used herein, a "client device" can include an electronic device capable of electronically receiving messages such as a computer (e.g., a desktop computer, laptop computer, tablet computer, etc.), a cellular or wireless phones (e.g., a smart phone), a personal digital assistant (PDA), a pager, or any other suitable electronic device.

As used herein, an "acquirer" may be a business entity (e.g., a commercial bank) that has a business relationship with a particular mobile merchant or other entity. As used herein, an "issuer" may be a business entity (e.g., a bank) that maintains financial accounts for consumers such as individuals, businesses, and other entities, and that may issue portable consumer devices such as credit and debit cards to consumers. Some entities may perform both issuer and acquirer functions. Embodiments of the invention encompass such single entity issuer-acquirers.

As used herein, a "payment processing network" may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transaction, and other types of commercial transactions. VisaNet™, in particular, includes a VIP system (Visa Integrated Payments system) which processes authorization requests and a Base II system which performs clearing and settlement services.

As used herein, an "authorization request message" may refer to a data message, or sequence of data messages, that requests an issuer of a payment account to authorize a transaction. An authorization request message according to an embodiment of the invention may comply with ISO (International Organization for Standardization) 8583, which is a standard for systems that exchange electronic transactions made by cardholders using payment cards. An authorization request message according to other embodiments may comply with other suitable standards.

As used herein, an "authorization response message" may refer to a data message, or sequence of data messages, that responds to a merchant's and/or acquirer's request to authorize a transaction. An authorization response message according to an embodiment of the invention may comply with ISO 8583, which, as described above, is a standard for systems that exchange electronic transactions made by cardholders using payment cards. An authorization response message according to other embodiments may comply with other suitable standards.

As used herein, a "clearing message" may refer to a data message, or sequence of data messages, used to exchange financial details between an acquirer and an issuer to facilitate posting to a consumer's account and reconciliation of the consumer's settlement position, the posting and reconciliation being associated with one or more transactions.

As used herein, a "settlement message" may refer to a data message, or sequence of data messages, used to transfer funds between an acquirer and an issuer, the funds being associated with one or more transactions.

As used herein, a "chargeback message" may refer to a data message, or sequence of data messages, used to return funds to an account holder, the funds being associated with one or more transactions. For example, a chargeback can be initiated by an issuer of the account, and may involve a reversal of a prior outbound transfer of funds from the account (e.g., a bank account, line of credit, credit card, debit card, prepaid card, etc.). A chargeback message can include one or more codes identifying the reasons for the reversal, such reasons including technical reasons (e.g., expired authorization, non-sufficient funds, bank processing error, etc.), clerical reasons (e.g., duplicate billing, incorrect amount billed, refund never issues, etc.), quality reasons (e.g., account holder claims to have never received goods or services as promised at the time of purchase), fraud reasons (e.g., the account holder claims they did not authorize the purchase and/or that they are the victim of identify theft), and other reasons.

As used herein, a "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to one or more databases and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Embodiments of the invention are related to systems and methods for analyzing transaction data for mobile merchant transactions, and generating a message based on the analysis for transmission to a mobile merchant. As described herein, transaction data for one or more transactions conducted at one or more mobile merchants can be received. The received transaction data can identify a location for each of the transactions, and can be stored and analyzed by a server computer. The server computer can generate a message based on the analysis, and can electronically transmit the message to a client device.

To illustrate, when a user makes a purchase at a mobile merchant (e.g., a food truck) using a portable consumer device (e.g., a credit card, debit card, etc.), the mobile merchant or user may swipe or scan the device at an access device of the mobile merchant such as a mobile POS terminal. The terminal may then generate and transmit an authorization request message to the mobile merchant's acquirer. If the mobile POS terminal is capable of determining its geographic location (e.g., utilizing a global positioning system (GPS)), the generated authorization request message can include the location of the terminal which corresponds to the location of the mobile merchant at the time of the transaction. The authorization request message can also include the date and time of the transaction, an authorization amount (e.g., the amount of the transaction), and other transaction data. For example, the authorization request message may indicate that the transaction occurred at Civic Center Plaza in San Francisco, Calif. on May 15, 2012 at 11:30 A.M., and that the authorization amount is $10.00. Upon receipt, the mobile merchant's acquirer can transmit the authorization request message to a payment processing network for forwarding to an issuer of the account associated with the consumer's device. The issuer may then perform a number of authorization, authentication, and fraud detection steps to make a decision regarding whether the transaction is to be approved. If the transaction is approved, the issuer can generate and transmit an authorization response message back to the payment processing network for forwarding to the mobile merchant's acquirer.

The payment processing network may store a record of the approved transaction in a database, the record including the date, time, and geographic location of the transaction. For example, the stored record may indicate that the authorization amount of $10.00 was approved by the issuer, and that the transaction occurred at Civic Center Plaza in San Francisco, Calif. on May 15, 2012 at 11:30 A.M. This process may be repeated for many transactions conducted at various mobile merchants. Thus, the database may aggregate time and location data for many transactions conducted at many geographic locations and times of day. Periodically, the payment processing network may analyze the stored transaction data and may generate various transaction volume reports. For example, a mobile merchant can request that the payment processing network provide a report on a daily basis, the report indicating the geographic locations and/or times of day associated with the highest sales volume. The report can be provided as an e-mail message, for example, and each day the mobile merchant can receive and review the report using their client device (e.g., a smartphone, computer, etc.) to determine where and when to "set up shop" in order to maximize revenue.

As another illustration, referring back to the above transaction, the user may later report to the issuer that the transaction was fraudulent. To reverse the fraudulent transaction, the issuer may generate and transmit a chargeback message to the payment processing network. The payment processing network may forward the chargeback message to the mobile merchant's acquirer to reverse the transaction, and may update the transaction record stored in the database to reflect that the previously approved transaction was in fact fraudulent. Thus, the database may store time, location, and fraud data for many transactions conducted at many mobile merchants. Periodically, the payment processing network may analyze the stored transaction data and may generate various fraud reports. For example, a mobile merchant can request that the payment processing network provide a report on a daily basis including the geographic locations and/or times of day associated with the highest fraud rate. The report can be provided as an e-mail message, for example, and each day the mobile merchant can receive and review the report using their client device and determine the geographic locations and/or times of day to avoid in order to reduce the financial losses associated with fraudulent transactions.

As another illustration, a mobile merchant may instruct the payment processing network to provide a fraud alert message if the mobile merchant is conducting transactions at a geographic location associated with a high risk of fraud. As described above, the payment processing network can periodically analyze transaction data to determine fraud rates for various locations. If the mobile merchant conducts a transaction at a location associated with a high fraud rate, an authorization request message for the transaction may be transmitted to the payment processing network, the authorization request message including the mobile merchant's location. Based on the authorization request message, the payment processing network can determine the mobile merchant's location. A fraud alert message may be generated as an SMS message, for example, and can be transmitted to the mobile merchant's client device (e.g., mobile phone, smartphone, etc.). Upon receipt of the fraud alert message, the mobile merchant can leave the location to conduct transactions elsewhere.

I. Exemplary Systems

FIG. 1 shows a block diagram of a payment processing system 100 that may be used in an embodiment of the invention. System 100 may include a plurality of users 102(a)-(c), portable consumer devices 104(a)-(c), mobile merchants 106(a)-(c), mobile access devices 108(a)-(c), acquirer computers 110(a)-(c), issuer computers 114(a)-(c), and a payment processing network 112. As shown in FIG. 1, a first user 102(a), a first portable consumer device 104(a), a first mobile merchant 106(a), and a first mobile access device 108(a) can be located at a first location 116(a). A second user 102(b), a second portable consumer device 104(b), a second mobile merchant 106(b), and a second mobile access device 108(b) can be located at a second location 116(b). A third user 102(c), a third portable consumer device 104(c), a third mobile merchant 106(c), and a third mobile access device 108(c) can be located at a third location 116(c).

The plurality of users 102(a)-(c) may each be an individual, or an organization such as a business that is capable of purchasing goods or services. The plurality of users 102(a)-(c) may also each be a merchant, an employee of the merchant, or any other individual who has access to one of the plurality of portable consumer devices 104(a)-(c).

The plurality of portable consumer devices 104(a)-(c) may be in any suitable form. For example, suitable portable consumer devices may be hand-held and compact so that it can fit into a user's wallet and/or pocket (e.g., pocket-sized). The plurality of portable consumer devices 104(a)-(c) may each include a processor, and memory, input devices, and output devices, operatively coupled to the processor. Specific examples of portable consumer devices may include cellular or wireless phones, personal digital assistants (PDAs), pagers, portable computers, smart cards, and the like. One or more of the plurality of portable consumer devices 104(a)-(c) may be a debit device (e.g., a debit card), credit device (e.g., a credit card), or stored value device (e.g., a pre-paid or stored value card).

The plurality of mobile merchants 106(a)-(c) may be entities that can sell goods and/or services, and that can engage in transactions at different locations. The plurality of mobile merchants 106(a)-(c) may each be associated with one of the plurality of mobile access devices 108(a)-(c) which may be in any suitable form.

Exemplary mobile access devices can include mobile point of sale (POS) devices, cellular phones (e.g., smart phones), PDAs, personal computers (PCs), tablet PCs, handheld specialized readers, set-top boxes, electronic cash registers, ATMs, virtual cash registers, kiosks, security systems, access systems, and the like. If a mobile access device is a mobile POS terminal, any suitable POS terminal may be used including card or phone readers. The card or phone readers may include any suitable contact or contactless mode of operation. For example, exemplary readers can include RF (radio frequency) antennas, magnetic stripe readers, etc. to interact with the plurality of portable consumer devices 104(a)-(c).

Figure 13:
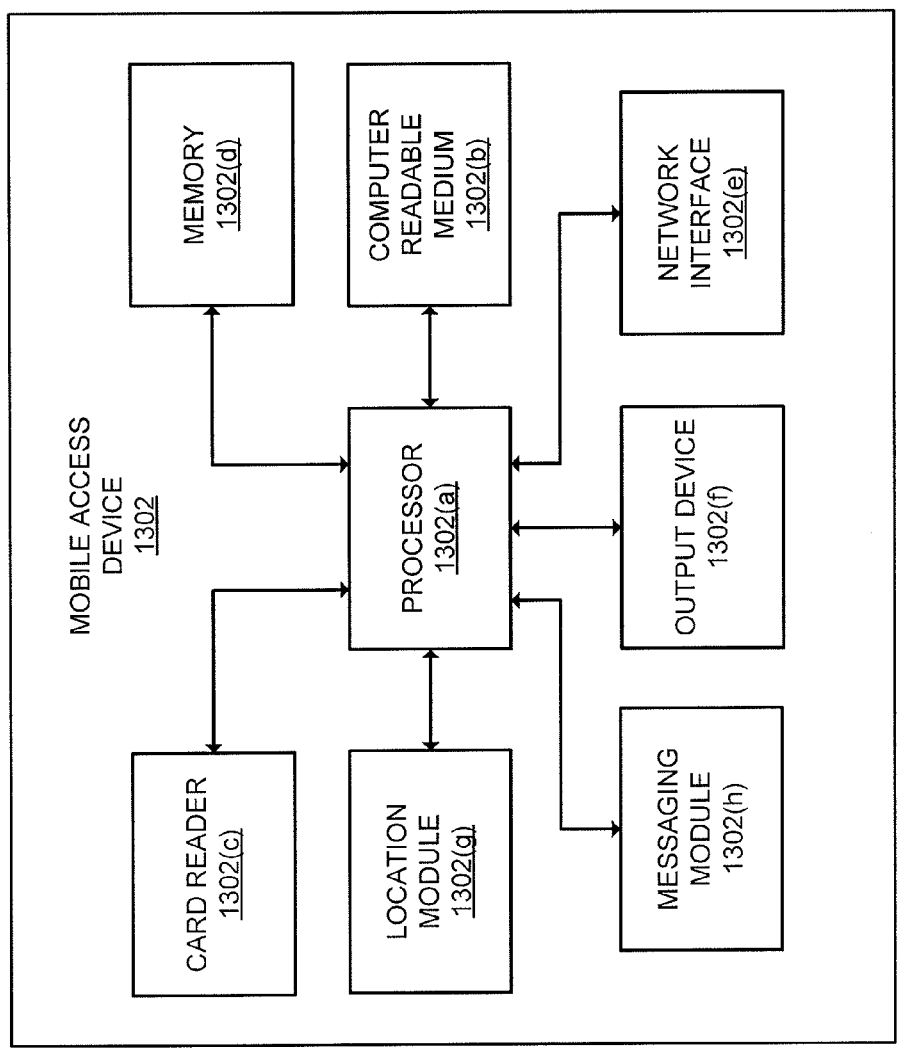
FIG. 13 shows a block diagram of an exemplary access device according to an embodiment of the invention.

FIG. 13 shows a block diagram of an exemplary mobile access device 1302 according to an embodiment of the invention. One or more of the plurality of mobile access devices 108(a)-(c) shown in FIGS. 1 and 2 may incorporate some or all of the components and functionalities of mobile access device 1302 as described below.

As shown in FIG. 13, the access device 1302 may comprise a processor 1302(a). It may also comprise a computer readable medium 1302(b), a card reader 1302(c), a memory 1302 (d), a network interface 1302(e), an output device 1302(f), a location module 1302(g), and a messaging module 1302(h), all operatively coupled to the processor 1302(a). A housing may house one or more of these components. Suitable output devices 1302(f) may include displays and audio output devices. Exemplary computer readable media 1302(b) may include one or more memory chips, disk drives, etc. The card reader 1302(c) of access device 1302 may include one or more radio frequency (RF) antennas, magnetic stripe readers, etc., that can interact with one or more of the plurality of portable consumer devices 104(a)-(c).

Messaging module 1302(h) may be configured to generate authorization response messages and/or to receive authorization response messages. Network interface 1302(e) may be configured to cooperate with messaging module 1302(h) to facilitate the exchange of authorization messages with acquirers, issuers, processors, payment processing networks, and/or other payment processing entities.

As described above, mobile access device 1302 can include location module 1302(g). In some embodiments, location module 1302(g) may include software and/or hardware for determining a geographic location of mobile access device 1302. For example, location module 1302(g) may utilize a Global Positioning System (GPS), cellular phone tower triangulation data, cellular phone tower signal strength data, wireless access point location data, an Internet Protocol (IP) address, or any other suitable means for determining a geographic location of mobile access device 1302.

In some embodiments, location module 1302(g) may cooperate with messaging module 1302(h) to generate authorization request messages including the geographic location of mobile access device 1302 at the time of transaction. For example, location module 1302(g) may determine the geographic location of mobile access device 1302, and transmit the location to messaging module 1302(h) for insertion into an authorization request message. In some embodiments, messaging module 1302(h) may generate an authorization request message including a location field, and insert the geographic location of mobile access device 1302 as a data element into the location field. The geographic location may be inserted, for example, as GPS coordinates and/or an address, intersection, intersection, monument, landmark, town, city, state, etc. In some embodiments, messaging module 1302(h) can insert the geographic location of mobile access device 1302 into an ISO 8583 message Returning to FIG. 1, in a purchase transaction, the first user 102(a), for example, may purchase goods or services at the first mobile merchant 106(a), at the first location 116(a), using the first portable consumer device 104(a) which may include a credit card, debit card, prepaid card, etc. The first portable consumer device 104(a) may interact with the first mobile access device 108(a) which may include a mobile POS terminal at the first mobile merchant 106(a). For example, the first user 102(a) may take a debit card and swipe it though an appropriate slot in the POS terminal.

Alternatively, the POS terminal may be a contactless reader, and the first portable consumer device 104(a) may be a contactless device such as a contactless card or phone. For example, the first user 102(a) may take a contactless card or a phone and pass it in front of the contactless reader to transmit financial information stored on the device.

An authorization request message may be generated by the first mobile access device 108(a) including the geographic location of the first mobile access device 108(a) (and hence the location of the first mobile merchant 106(a)), and other transaction data (e.g., the transaction date, time, authorization amount, etc.). The authorization request message may be transmitted by the first mobile access device 108(a) to the first acquirer computer 110(a). After receiving the authorization request message, the first acquirer computer 110(a) may then transmit the authorization request message to the payment processing network 112. The payment processing network 112 may then either reject the authorization request message and cancel the transaction, or accept the authorization request message and forward it to the first issuer computer 114(a) associated with the first portable consumer device 104(a).

After receiving the authorization request message, the first issuer computer 114(a) may perform a number of authorization, authentication, and fraud detection processes in order to make an authorization decision. The first issuer computer 114(a) may then generate and send an authorization response message to the payment processing network 112 indicating whether the transaction is approved. The payment processing network 112 may transmit the authorization response message to the first acquirer computer 110(a) which may then transmit the authorization response message back to the first mobile access device 108(a).

Upon receipt of the authorization response message, the first mobile access device 108(a) may provide the authorization response message to the first user 102(a) on a display or printed out on a receipt.

At the end of the day, a normal clearing and settlement process may be conducted by the payment processing network 112 in cooperation with the first issuer computer 114(a) and the first acquirer computer 110(a). A clearing process can be a process of exchanging financial details between an acquirer and an issuer to facilitate posting to a consumer's account and reconciliation of the consumer's settlement position. A settlement process can be a process of transferring funds between an acquirer and issuer. In some embodiments, authorization and settlement can occur simultaneously.

As described herein, the payment processing network 112 can store a record of the transaction including transaction data contained in the authorization request and response messages. The transaction data can include, for example, the time, date, location, and authorized amount for the transaction. The above electronic transaction can be repeated for a plurality of transactions conducted at the plurality of mobile merchants 106(a)-(c), and at the plurality of locations 116(a)-(c). Thus, the payment processing network 112 can store transaction data for a plurality of transactions involving the plurality of users 102(a)-(c), portable consumer devices 104(a)-(c), mobile merchants 106(a)-(c), mobile access devices 108(a)-(c), acquirer computers 110(a)-(c), issuer computers 114(a)-(c), and at the plurality of locations 116(a)-(c). The components and functionalities of the payment processing network 112 according to various embodiments of the invention are described in further detail below.

Figure 2:
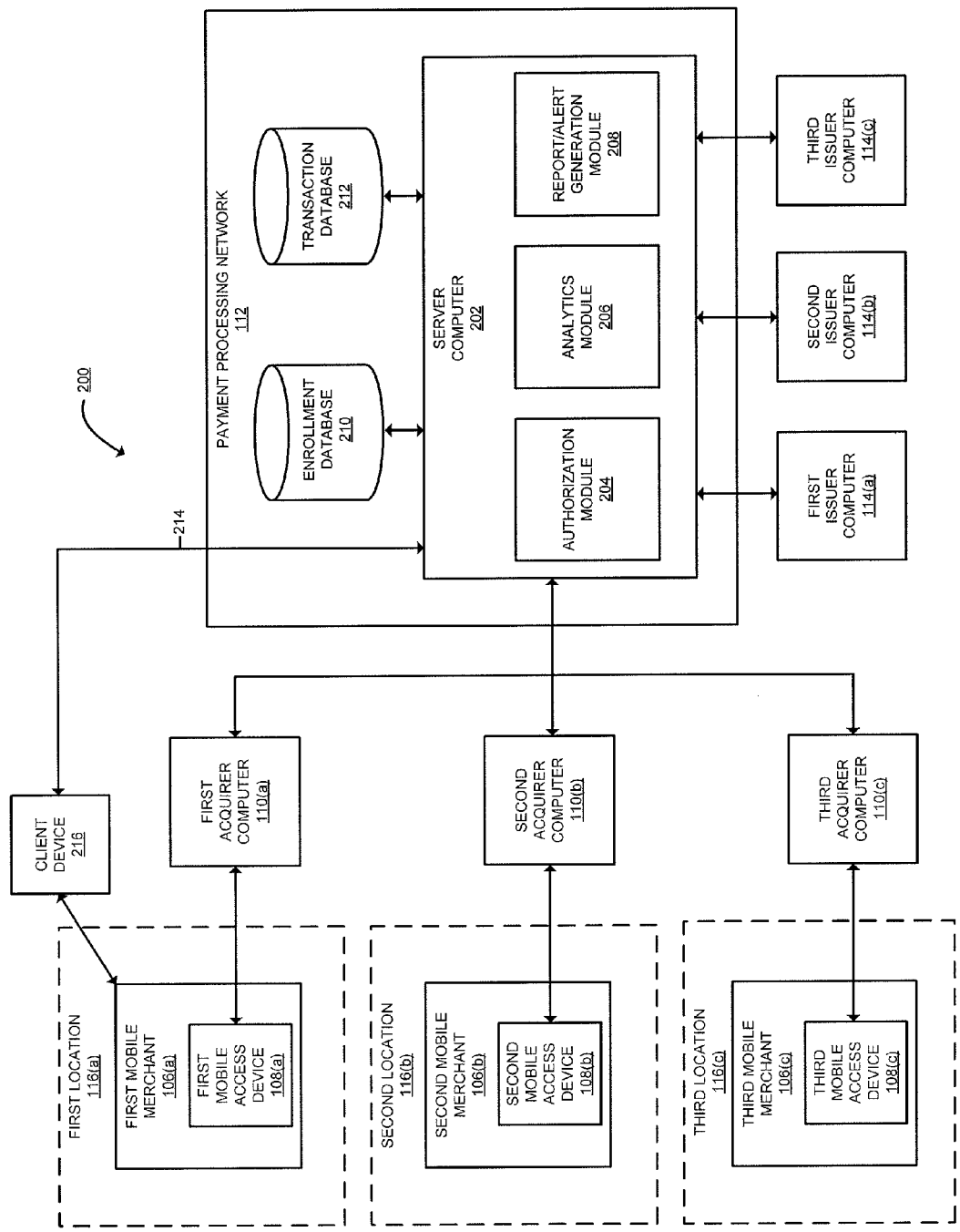
FIG. 2 shows a block diagram of a payment processing system according to an embodiment of the invention.

FIG. 2 shows a block diagram of a payment processing system 200 according to an embodiment of the invention. For simplicity of discussion, only one of each component is shown for several of the components. It is to be understood, however, that embodiments of the invention may include more than one of each component. In addition, some embodiments of the invention may include fewer than all of the components shown in FIG. 2. The various modules and databases in FIG. 2 may each be located within the payment processing network 112, outside the payment processing network 112, and/or distributed at different locations. Further, the components in FIG. 2 may communicate via any suitable communication medium such as the Internet using any suitable communication protocol.

System 200 may include the plurality of mobile merchants 106(a)-(c) and the plurality of mobile access devices 108(a)-(c) located at the plurality of locations 116(a)-(c). The plurality of users 102(a)-(c) shown in FIG. 1 may purchase goods or services at the plurality of mobile merchants 106(a)-(c) using the plurality of portable consumer devices 104(a)-(c). The plurality of acquirer computers 110(a)-(b) may communicate with the payment processing network 112 which may be in communication with the plurality of issuer computer 114(a)-(c) associated with the issuers of the plurality of portable consumer devices 104(a)-(c). System 200 may also include one or more acquirer processor computers and issuer processor computers (not shown) associated with one or more acquirer processors issuer processors, respectively. Further, one or more of the plurality of mobile merchants 106(a)-(c) can operate a client device. For example, as shown in FIG. 2, the first mobile merchant 106(a) may operate client device 216 such as a computer (e.g., a desktop computer, laptop computer, tablet computer, etc.), a cellular or wireless phones (e.g., a smart phone), a personal digital assistant (PDA), a pager, or any other suitable electronic device. In some embodiments, a client device may also perform the functions of a mobile access device. For example, the first mobile access device 108(a) and the client device 216 can be a single device.

As shown in FIG. 2, the payment processing network 112 may include a server computer 202 comprising an authorization module 204, an analytics module 206, and a report/alert generation module 208. The various modules may be embodied by computer code residing on a computer readable medium. The server computer 202 may be in communication with the plurality of issuer computers 114(a)-(c) and acquirer computers 110(a)-(c) by one or more communication channels. For example, authorization, clearing, settlement, and chargeback messages may be exchanged via any suitable communication medium such as the Internet using any suitable communication protocol. In some embodiments of the invention, an alternative communication channel 214 may be used to transmit messages (e.g., reports and/or alerts) to client device 216 operated by the first mobile merchant 106(a) and/or client devices operated by other mobile merchants. The alternative communication channel 214 may include the Internet, a telecommunications network, or any other suitable electronic communication channel configured to facilitate the exchange of messages using any suitable communication protocol.

The server computer 202 may be operatively coupled to one or more databases, including an enrollment database 210 and a transaction database 212.

The authorization module 204 may perform a number of functions related to receiving and forwarding authorization request and authorization response messages. Upon receiving an authorization request message from one of the plurality of acquirer computers 110(a)-(c), the authorization module 204 may forward the authorization request message to one of the plurality of issuer computers 114(a)-(c). Upon receiving an authorization response message from one of the plurality of issuer computers 114(a)-(c), the authorization module 204 may transmit the authorization response message to the one of the plurality of acquirer computers 110(a)-(c). The authorization module 204 may also extract transaction data from authorization request and response messages and transmit the extracted data to the transaction database 212 for storage. If a clearing message, settlement message, or chargeback message is received from one of the plurality of issuer computers 114(a)-(c) or acquirer computers 110(a)-(b), the authorization module 204 may also extract transaction data from such messages and transmit the transaction data to the transaction database 212 for storage.

The analytics module 206 may perform a number of functions related to analyzing transaction data stored in the transaction database 212 and generating transaction volume data and/or fraud data. For example, the analytics module 206 can periodically (e.g., every 30 seconds, 1 minute, 5 minutes, 10 minutes, 30 minutes, hour, 12 hours, daily, weekly, monthly, etc.) access the transaction data stored in the transaction database 212, analyze the transaction data, and generate transaction volume data and/or fraud data for various geographic locations and/or times of day. In some embodiments, analytics module 206 may access enrollment data stored in the enrollment database 210 to determine the parameters for analyzing the transaction data stored in the transaction database 212. For example, mobile merchants may enroll with the server computer 202 and provide preferences for the types of messages (e.g., reports and/or alerts) they desire to receive, the level of detail to be included in the messages, the frequency for which the transaction data is analyzed, the time and date interval for the analysis, and other preferences. Upon enrollment, the mobile merchant preferences may be stored in the enrollment database 210. Based on the preferences, the analytics module 206 may analyze the transaction data stored in transaction database 212, and generate transaction volume and/or fraud data for selected geographic locations and/or times of day. The data may be transmitted to report/alert generation module 208 so that a message can be generated and transmitted to a client device.

The report/alert generation module 208 may perform a number of functions relating to generating and transmitting a message to a client device (e.g., a client device operated by mobile merchant). As described herein, the message can be a report, an alert, or any other suitable electronic communication. Messages can be generated by the report/alert generation module 208 based on the transaction volume and/or fraud data received from the analytics module 206, and can be transmitted to a client device in the form of an e-mail, SMS message, instant message, page, telephone call, or any other suitable form of electronic communication. The message can be transmitted by the report/alert generation module 208 to a client device over the same communication channel used to exchange authorization messages, or over the alternative communication channel 214.

As explained above, the enrollment database 210 may store enrollment data as provided by mobile merchants during an enrollment process. In embodiments of the invention, the enrollment data may be stored in enrollment database 210 in the form of enrollment data tables.

FIG. 3 shows an enrollment data table 300 as stored in enrollment database 210 according to an embodiment of the invention. As illustrated in FIG. 3, enrollment data table 300 may include various data fields including enrollment data. For example, for enrolled mobile merchants, enrollment data table 300 may include a Mobile Merchant ID Field 300(a) including a mobile merchant identifier (e.g., MW, DBA, mobile access device identifier, etc.), a Region Field 300(b) including the geographic regions (e.g., landmarks, monuments, neighborhoods, towns, cities, collections of towns or cities, counties, states, etc.) for which the mobile merchant wants to receive report and/or alerts, a Report Type Field 300(c) including the types of reports the mobile merchant prefers to receive (e.g., transaction volume, fraud rate, time, location, report detail preferences, etc.), a Report Frequency Field 300(d) including the frequency that the mobile merchant prefers to receive reports (e.g., hourly, daily, monthly, etc.), a Report Format Field 300(e) including the mobile merchant's preferred report format (e.g., e-mail, SMS, phone call, web-based report dashboard, etc.), an Alert Type Field 300(f) including the types of alerts the mobile merchant prefers to receive (e.g., fraud rate, transaction volume, time, location, alert detail preferences, etc.), and an Alert Format Field 300(g) including the mobile merchant's preferred alert format (e.g., e-mail, SMS, phone call, etc.). Enrollment data table 300 may include additional fields with further data such as contact information for the mobile merchant (e.g., e-mail address, phone number, etc.). Any suitable combination of the fields shown in enrollment data table 300 may be used, and more, less, or different fields may be included according to various embodiments of the invention.

The data stored in enrollment database 210 may be provided by mobile merchants. For example, during the enrollment process, mobile merchants can provide identification information, contact information, and preferences via a web-based interface in communication with server computer 202.

The transaction database 212 may store transaction data extracted from various electronic messages received at server computer 202 such as authorization request messages, authorization response messages, clearing messages, settlement messages, and/or chargeback messages. In embodiments of the invention, the transaction data may be stored in transaction database 212 in the form of transaction data tables.

FIG. 4 shows a transaction data table 400 as stored in transaction database 212 according to an embodiment of the invention. As seen in FIG. 4, transaction data table 400 may include various data fields including transaction data. For example, for individual transactions, transaction data table 400 may include a Mobile Merchant ID Field 400(a) including a mobile merchant identifier (e.g., MVV, DBA, access device identifier, etc.), a Date/Time Field 400(b) including the date and time of the transaction, a Location Field 400(c) including the geographic location of the transaction (e.g., GPS coordinates, address, intersection, monument, landmark, town, city, state, etc.), an Authorization Amount Field 400(d) including the transaction amount submitted for authorization by the issuer, an Authorization Category Field 400(e) including the authorization category based on an authorization response, clearing, settlement, or chargeback message received from the issuer (e.g., approved, declined, chargeback), and a Fraud Field 400(f) indicating whether the transaction has been identified as fraudulent by the account holder, payment processing network, and/or issuer of the account. Transaction data table 400 may also include additional fields with further data such as a unique transaction identifier, transaction class (e.g., credit, debit, prepaid, etc.), acquirer identifier, acquirer processor identifier, issuer identifier (e.g., BIN, etc.), issuer processor identifier, one or more error codes, cardholder or account holder information (e.g., name, date of birth, address, phone number, etc.), card verification value (CVV), expiration date, loyalty account information, and other information associated with the transaction. Any suitable combination of the fields shown in transaction data table 300 may be used, and more, less, or different fields may be included according to various embodiments of the invention.

II. Exemplary Reports and Alerts

As explained above, analytics module 206 can analyze the transaction data stored in transaction database 212 based on mobile merchant preferences stored as enrollment data in enrollment database 210. Analytics module 206 can generate transaction volume and/or fraud data based on the analysis, and transmit the data to report/alert generation module 208. In embodiments of the invention, report/alert generation module 208 may generate and transmit a message to a client device. Exemplary messages are described in further detail below.

FIG. 5 shows a transaction volume by location report 500 according to an embodiment of the invention. As shown in FIG. 5, transaction volume by location report 500 may include information describing transaction volume statistics for various geographic locations. For example, for transactions conducted by mobile merchants at a given location 500(a) and for a selected date interval 500(b), transaction volume by location report 500 can provide the total sales volume 500(c) (e.g., the total amount of approved transactions not subject to chargeback for all mobile merchants), the transaction count 500(d) (e.g., the total number of transactions conducted by all mobile merchants), the mobile merchant count 500(e) (e.g., the total number of mobile merchants conducting transactions), the sales volume per mobile merchant 500(f) (e.g., the sales volume divided by the mobile merchant count), and the transaction count per mobile merchant 500(g) (e.g., the transaction count divided by the mobile merchant count). In embodiments of the invention, more, less, or different information may be included in transaction volume by location report 500 depending on the mobile merchant preferences stored in enrollment database 210. Such reports may enable mobile merchants to choose the most profitable geographic locations to conduct transactions.

Some mobile merchants may conduct transactions at more than one location during any given day, and thus they may want to know transaction volume statistics at the temporal level. FIG. 6 shows a transaction volume by time report 600 according to an embodiment of the invention. As shown in FIG. 6, transaction volume by time report 600 may include information describing transaction volume statistics for various times of day. For example, for transactions conducted by mobile merchants at a given location 600(a), transaction volume statistics can be provided for selected time intervals 600(c). Such statistics may be provided for a single day or may be averaged over the span of a week, month, etc., as reflected by the date interval 600(b). For a given time interval 600(c) and geographic location 600(a), transaction volume by time report 600 can provide the total sales volume 600(d) (e.g., the total amount of approved transactions not subject to chargeback for all mobile merchants), the transaction count 600(e) (e.g., the total number of transactions conducted by all mobile merchants), the mobile merchant count 600(f) (e.g., the total number of mobile merchants conducting transactions), the sales volume per mobile merchant 600(g) (e.g., the sales volume divided by the mobile merchant count), and the transaction count per mobile merchant 600(h) (e.g., the transaction count divided by the mobile merchant count). In embodiments of the invention, more, less, or different information may be included in transaction volume by time report 600 depending on the mobile merchant preferences stored in enrollment database 210. Such reports may enable merchants to choose the most profitable geographic locations to conduct transactions at specific time intervals throughout a given day.

Mobile merchants may also want to be provided with fraud statistics for various geographic locations. FIG. 7 shows a fraud rate by location report 700 according to an embodiment of the invention. As shown in FIG. 7, fraud rate by location report 700 may include information describing fraud statistics for various locations. For example, for transactions conducted by mobile merchants at a given location 700(a) and for a selected date interval 700(b), fraud rate by location report 700 can provide the transaction count 700(c) (e.g., the total number of transactions conducted by all mobile merchants), the fraudulent transaction count 700(d) (e.g., the total number of transactions conducted by all mobile merchants that have been identified as fraudulent), and the fraud rate 700(e) (e.g., the percentage of all transactions conducted by all mobile merchants that have been identified as fraudulent). In embodiments of the invention, more, less, or different information may be included in fraud rate by location report 700 depending on the mobile merchant preferences stored in enrollment database 210. Such reports may enable mobile merchants to avoid geographic locations associated with an undesirably high rate of fraud.

As described above, some mobile merchants may conduct transactions at more than one location during any given day. Thus, such merchants may want to know fraud statistics at the temporal level. FIG. 8 shows a fraud rate by time report 800 according to an embodiment of the invention. As shown in FIG. 8, fraud rate by time report 800 may include information describing fraud statistics for various times of day. For example, for transactions conducted by mobile merchants at a given location 800(a), fraud statistics can be provided for selected time intervals 800(c). Such statistics may be provided for a single day or may be averaged over the span of a week, month, etc., as reflected by the date interval 800(b). For a given time interval 800(c) and geographic location 800(a), fraud rate by time report 800 can provide the transaction count 800(d) (e.g., the total number of transactions conducted by all mobile merchants), the fraudulent transaction count 800(e) (e.g., the total number of transactions conducted by all mobile merchants that have been identified as fraudulent), and the fraud rate 800(f) (e.g., the percentage of all transactions conducted by all mobile merchants that have been identified as fraudulent). In embodiments of the invention, more, less, or different information may be included in fraud rate by time report 800 depending on the mobile merchant preferences stored in enrollment database 210. Such reports may enable mobile merchants to avoid geographic locations associated with an undesirably high rate of fraud at specific time intervals throughout a given day.

In addition to reports, report/alert generation module 208 may generate and transmit alerts to client devices (e.g., client devices operated by mobile merchants). While reports may be generated periodically depending on mobile merchant preferences, alerts may be generated in response to a triggering event. For example, in embodiments of the invention, an alert may be generated when a mobile merchant is conducting transactions at a geographic location associated with a high rate of fraud.

FIG. 9 shows a fraud alert message 900 according to an embodiment of the invention. As shown in FIG. 9, fraud alert message 900 can inform a mobile merchant that they are conducting transactions at a location associated with an undesirably high rate of fraud. Fraud alert message 900 can include the mobile merchant's current location 900(a), the current date and time 900(b), and the historical fraud rate 900(c) for the location as determined by analytics module 206. The historical fraud rate 900(c) can be based on the past hour, day, week, month, or any suitable interval of time depending on the mobile merchant's preferences, industry best practices, etc. In embodiments of the invention, more, less, or different information may be included in fraud alert message 900. Such reports may enable mobile merchants to be notified in real-time that they are conducting transactions in an areas associated with fraud so that the mobile merchant can leave the area to conduct transactions at a different geographic location.

In some embodiments, alerts can also include information relating to transaction volume. For example, an alert may be generated when a mobile merchant is conducting transactions at a geographic location associated with a low sales volume or an undesirably high mobile merchant count. Time of day may also be taken into account. As another example, an alert may be transmitted to a mobile merchant indicating a likelihood that sales volume will drop off within an hour at the mobile merchant's location or that the overall mobile merchant count will increase to an undesirably large number. Such likelihoods can be determined by server computer 202 based on the transaction data stored in transaction database 212. In various embodiments of the invention, any suitable combination of transaction volume and fraud statistics may be included in the generated reports and alerts.

III. Exemplary Methods

Figure 10:
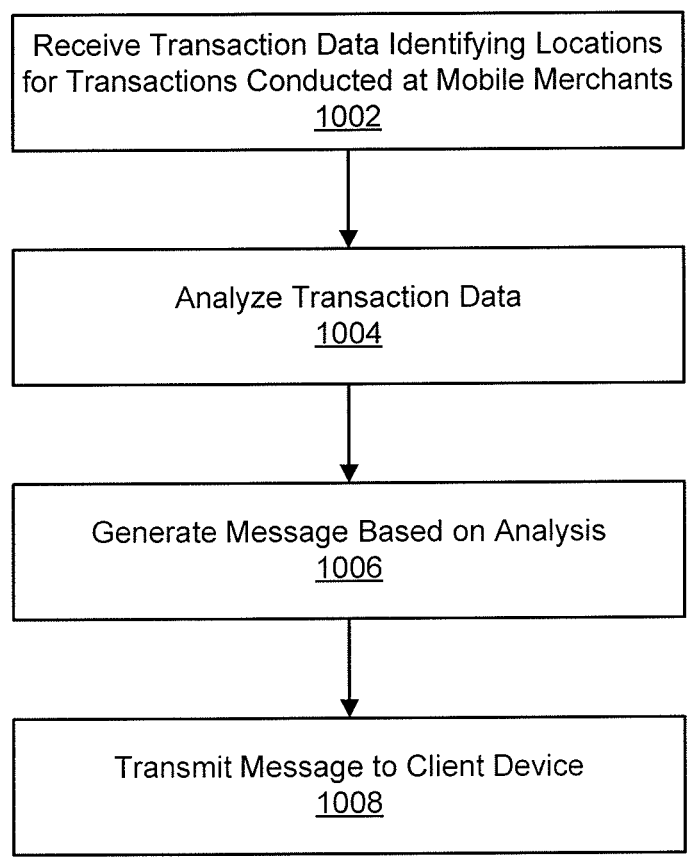
FIG. 10 illustrates a flow diagram showing a method for analyzing transaction data for mobile merchant transactions, and generating a message based on the analysis according to an embodiment of the invention.

FIG. 10 illustrates a flow diagram showing a method 1000 for analyzing transaction data for mobile merchant transactions, and generating a message based on the analysis according to an embodiment of the invention. The steps of method 1000 can be performed, for example, by server computer 202 shown in FIG. 2. In other embodiments of the invention, one or more steps of method 1000 may be performed by any other suitable computer system, such as one or more of the plurality of issuer computers 114(a)-(c), acquirer computers 110(a)-(c), an issuer processor computer, an acquirer processor computer, or any other suitable computer system.

As described above, when a transaction is conducted at a mobile merchant, the merchant's mobile access device can generate an authorization request message including transaction data such as the location of the mobile access device at the time of the transaction. For example, the merchant's mobile access device may utilize a Global Position System (GPS), cellular phone tower triangulation data, cellular phone tower signal strength data, wireless access point location data, an Internet Protocol (IP) address, or any other suitable means for determining a geographic location of the mobile access device. In some embodiments, a mobile access device may generate an authorization request message including a location field, and insert the geographic location of the mobile access device as a data element into the location field. The geographic location may be inserted, for example, as GPS coordinates and/or an address, intersection, intersection, monument, landmark, town, city, state, etc. In some embodiments, a mobile access device can insert the geographic location into an ISO 8583 message. As further described above, an authorization request message may be further generated to include other transaction data such as an authorization amount, time, date, mobile merchant identifier, and other information for a transaction. Such authorization request messages may be received and analyzed by server computer 202 as part of the transaction authorization process.

In some embodiments, transaction data may be generated by other entities shown in FIGS. 1-2. For example, transaction data including the time, date, location, and other information for a transaction may be included in an authorization response message received by server computer 202 from an issuer computer. Settlement and clearing messages exchanged between issuer and acquirer computers and including transaction data may also be routed through server computer 202. Moreover, in the case of fraud, a chargeback message generated by an issuer computer may include transaction data associated with the fraudulent transaction. Such chargeback messages may also be routed through server computer 202 as described above.

In FIG. 10, at step 1002, method 1000 may begin by server computer 202 receiving transaction data for one or more transactions conducted at one or more mobile merchants. As described herein, the transaction data for individual transactions can be received as part of an authorization request message, an authorization response message, a clearing message, a settlement message, and/or a chargeback message. For example, an authorization request and/or response message for a transaction can include transaction data such as the location of the transaction (e.g., GPS coordinates, address, intersection, monument, landmark, etc.), a mobile merchant identifier (e.g., MVV, DBA, access device identifier, etc.), date, time, authorization amount (e.g., the transaction amount submitted for authorization), authorization category (e.g., approved, declined, chargeback, etc.), and other information. Clearing and settlement messages exchanged between issuer and acquirer computers through server computer 202 may also contain such transaction data. In another example, chargeback messages received from issuer computers may include transaction data identifying at least one of the one or more transactions as fraudulent. If an account holder reports a transaction conducted at a mobile merchant as fraudulent, the issuer may transmit such a chargeback message to the mobile merchant's acquirer via payment processing network 112 to reverse the transaction, and thus the chargeback message may be received at server computer 202.

Upon receipt by server computer 202, the transaction data for the one or more transactions may be stored. For example, server computer 202 may include volatile memory such as random access memory or RAM (sometimes referred to as system memory). The received transaction data may be stored in the RAM in some embodiments. Server computer 202 may also include non-volatile memory such as one or more databases, storage disks or devices, flash memory, or other non-volatile memory devices. For example, authorization module 204 of server computer 202 can extract the transaction data from the received authorization, clearing, and/or settlement message, and store the transaction data in transaction database 212. As shown in FIG. 4, the transaction data can be stored in the form of a transaction data table 400. When a chargeback message is received for a transaction that was previously authorized and stored in transaction database 212, at step 1002, authorization module 204 can update the transaction record stored in transaction database 212 to reflect the fraudulent transaction (e.g., by updating Fraud Field 400(*f*) of transaction data table 400 shown in FIG. 4).

At step 1004, analytics module 206 may analyze the transaction data for the one or more transactions conducted at the one or more mobile merchants. For example, analytics module 206 may periodically (e.g., every 30 seconds, 1 minute, 5 minutes, 10 minutes, 30 minutes, hour, 12 hours, daily, weekly, monthly, etc.) access the transaction data stored in the transaction database 212, analyze the transaction data, and generate transaction volume data and/or fraud data for various geographic locations and/or times of day. In some embodiments, before analyzing the stored transaction data, analytics module 206 may access enrollment data stored in the enrollment database 210 to determine the parameters for the transaction data analysis. For example, when mobile merchants enroll with server computer 202, they can provide preferences for the types of messages (e.g., reports and/or alerts) they desire to receive, the level of detail to be included in the messages, the frequency for which the transaction data is analyzed, the time and date interval for the analysis, and other preferences. The mobile merchant preferences may be stored in enrollment database 210. Based on the stored mobile merchant preferences, analytics module 206 may analyze the transaction data stored in the transaction database 212, and generate transaction volume and/or fraud data for selected geographic locations and/or times of day. The generated data may be transmitted to report/alert generation module 208 so that a message can be generated and transmitted to a client device.

As an illustration of step 1004, analytics module 206 may access enrollment database 210 to retrieve enrollment data table 300 (shown in FIG. 3). Based on data fields 300(*a*)-(*e*), analytics module 206 may determine that Mobile Merchant "123456" has set the San Francisco Bay Area as a preferred region, and has requested that Report Type A be transmitted monthly as an e-mail message. As an example, Report Type A may correspond to transaction volume by time report 600 shown in FIG. 6. Based on these preferences, analytics module 206 may analyze the transaction data stored in transaction database 212 accordingly. Thus, analytics module 206 may aggregate all mobile merchant transactions conducted in the San Francisco Bay Area for the current or previous month, for example, and may then generate the various types of transaction volume data included in FIG. 5 such as sales volume 500(*c*), transaction count 500(*d*), mobile merchant count 500(*e*), sales volume per mobile merchant 500(*f*), transaction count per mobile merchant 500(*g*), and/or other transaction volume data. Once the transaction data is analyzed and the transaction volume data required for Report Type A generated, the data may be transmitted by analytics module 206 to report/alert generation module 208. Analytics module 206 may also transmit an indication to report/alert generation module 208 that Mobile Merchant "123456" prefers to receive reports on their client device by e-mail, and method 1000 can proceed to step 1006.

At step 1006, report/alert generation module 208 can generate a message based on the transaction volume and/or fraud data received from analytics module 206. The message can include a report, alert, or any other electronic communication, and can be generated as an e-mail, SMS message, instant message, page, telephone call, or any other suitable form of electronic communication. As described above, the preferred format of the received message can be stored in enrollment database 210. Referring back to the above illustration, upon receiving the transaction volume data and the e-mail report format preference from analytics module 206, report/alert generation module 208 can generate transaction volume by location report 500 in the form of an e-mail message, and method 1000 can proceed to step 1008.

At step 1008, report/alert generation module 208 can electronically transmit the generated message to a client device (e.g., a client device operated by a mobile merchant). The message can be transmitted to the client device using any suitable electronic means such as the Internet, cellular network, etc. In some embodiments, the message can be transmitted directly to the client device (e.g., as an e-mail, SMS message, instant message, page, telephone call, etc.). In some embodiments, the message can be transmitted to a database hosting a web-based dashboard accessible to an enrolled mobile merchant via their client device. Referring back to the above illustration, at step 1008, report/alert generation module 208 can transmit transaction volume by location report 500 as an e-mail message accessible to a client device (e.g., a smartphone) of Mobile Merchant "123456."

While reports may be generated periodically depending on mobile merchant preferences, in embodiments of the invention, alert messages may be triggered in response to a triggering event. For example, in embodiments of the invention, a fraud alert message may be generated when a mobile merchant is conducting transactions at a geographic location associated with a high rate of fraud.

Figure 11:
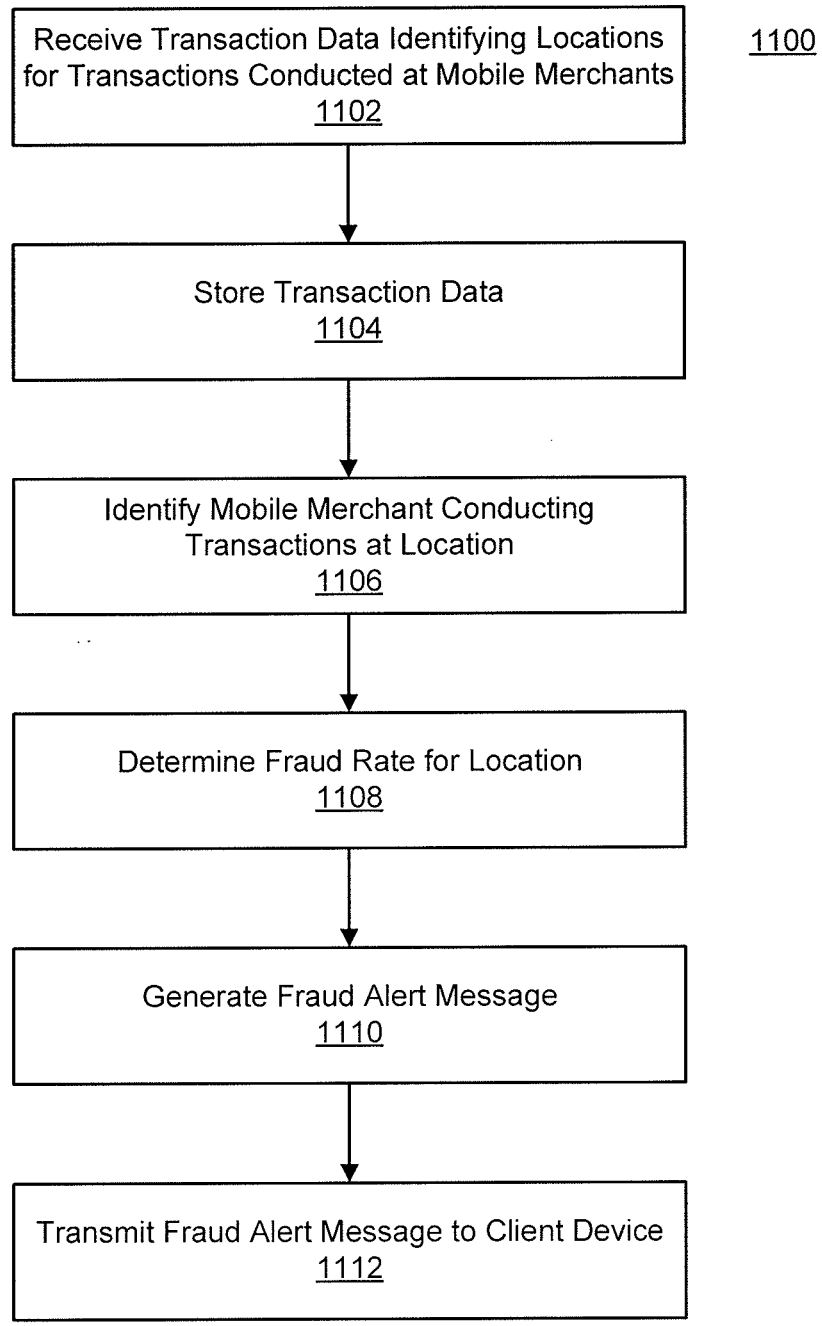
FIG. 11 illustrates a flow diagram showing a method for analyzing transaction date for mobile merchant transactions, and generating a fraud alert message based on the analysis according to an embodiment of the invention.

FIG. 11 illustrates a flow diagram showing a method 1100 for analyzing transaction date for mobile merchant transactions, and generating a fraud alert message based on the analysis according to an embodiment of the invention.

At step 1102, method 1100 may begin by server computer 202 receiving transaction data for one or more transactions conducted at one or more mobile merchants. As described herein, the transaction data can be received as part of an authorization request message, an authorization response message, a clearing message, a settlement message, and/or a chargeback message. For example, an authorization request and/or response message for a transaction can include transaction data such as the location of the transaction (e.g., GPS coordinates, address, intersection, monument, landmark, etc.), a mobile merchant identifier (e.g., MVV, DBA, access device identifier, etc.), date, time, authorization amount (e.g., the transaction amount submitted for authorization), authorization category (e.g., approved, declined, chargeback, etc.), and other information. In another example, received chargeback messages may include transaction data identifying one or more of the plurality of transactions as fraudulent. If an account holder reports a transaction conducted at a mobile merchant as fraudulent, the issuer may transmit such a chargeback message to the mobile merchant's acquirer via payment processing network 112 to reverse the transaction, and thus the chargeback message may be received at server computer 202. Upon receipt of the transaction data for the plurality of transactions conducted at the plurality of mobile merchants, method 1000 can proceed to step 1004.

At step 1104, the transaction data received at server computer 202 may be stored. For example, as described herein, authorization module 204 of server computer 202 can extract the transaction data from the received authorization, clearing, and/or settlement message, and store the transaction in transaction database 212. As shown in FIG. 4, the transaction data can be stored in the form of a transaction data table 400. When a chargeback message is received for a transaction that was previously authorized and stored in transaction database 212, at step 1004, authorization module 204 can update the transaction record stored in transaction database 212 to reflect the fraudulent transaction (e.g., by updating Fraud Field 400(f) of transaction data table 400 shown in FIG. 4). In some embodiments, server computer 202 may store all or part of the received transaction in volatile memory such as random access memory or RAM. Once the transaction data has been stored, method 1000 may proceed to step 1106.

At step 1106, analytics module 206 may determine that a mobile merchant is conducting transactions at a particular location. For example, analytics module 206 can access the transaction data stored in database 212 to determine that the mobile merchant has recently conducted a transaction at the particular location. In some embodiments, analytics module 206 may access transaction data stored in volatile memory (e.g., RAM) and determine that the mobile merchant has recently conducted a transaction at the location. Referring back to the above illustration, analytics module 206 may access transaction database 212 to retrieve transaction data table 400 (shown in FIG. 4). Based on data fields 400(a)-(e), analytics module 206 may determine that Mobile Merchant "123456" recently conducted a transaction at Civic Center Plaza in San Francisco, Calif.

Analytics module 206, at step 1108, may analyze the stored transaction data to generate fraud data for the location of the recent transaction based on the mobile merchant's preferences. For example, analytics module 206 may access enrollment database 210 to retrieve the mobile merchant's preferences for fraud alert messages. Based on the stored preferences, analytics module 206 may analyze the transaction data stored in the transaction database 212 for the one or more transactions conducted at the one or more mobile merchants, and generate fraud data for the particular geographic location at which the mobile merchant recently conducted the transaction.

As an illustration of step 1108, analytics module 206 may access enrollment database 210 to retrieve enrollment data table 300 (shown in FIG. 3). Based on data fields 300(f)-(g), analytics module 206 may determine that Mobile Merchant "123456" has requested that Alert Type W be transmitted as an SMS message. As an example, Alert Type W may correspond to fraud alert message 900 shown in FIG. 9. Based on these preferences, analytics module 206 may analyze the transaction data stored in transaction database 212 accordingly. Thus, analytics module 206 may aggregate all mobile merchant transactions conducted at the Civic Center Plaza in San Francisco, Calif. for a selected period of time (e.g., the current day, month to date, previous month, etc.), and may determine the fraud rate for the location. Once determined, analytics module 206 can transmit the fraud rate as fraud data to report/alert generation module 208 along with an indication that Mobile Merchant "123456" prefers to receive alerts as SMS messages. Method 1100 can then proceed to step 1110.

At step 1110, report/alert generation module 208 can generate a fraud alert message based on the fraud data received from analytics module 206. The message can be generated as an e-mail, SMS message, instant message, page, telephone call, or any other suitable form of electronic communication. As described above, the preferred format of the received message can be stored in enrollment database 210. Referring back to the above illustration, upon receiving the fraud data for the Civic Center Plaza and the SMS alert message format preference from analytics module 206, report/alert generation module 208 can generate fraud alert message 900 in the form of an SMS message, and method 1100 can proceed to step 1112.

At step 1112, report/alert generation module 208 can electronically transmit the generated fraud alert message to a client device of the mobile merchant. The message can be transmitted using any suitable electronic means such as over the Internet, a cellular network, etc. Referring back to the above illustration, at step 1112, report/alert generation module 208 can transmit fraud alert message 900 as an SMS message to a smartphone of Mobile Merchant "123456."

Embodiments of the invention provide a number of technical advantages over existing computational solutions to the problem of determining transaction volume and fraud statistics for mobile merchant transactions. For example, by extracting transaction data from messages in a common format (e.g., authorization messages, clearing messages, settlement messages, chargeback messages, and the like), the data normalization and reformatting required by existing solutions is reduced and in some cases eliminated altogether. Consequently, computing resources are preserved. Payment processing networks are centrally located (in an operational sense) between issuers and virtually all mobile merchants that accept credit cards, debit cards, and other forms of electronic payment, and thus transaction data can be analyzed for large volumes of transactions conducted at many different locations and times of day. As such, in embodiments of the invention, the generated transaction volume and fraud statistics may be associated with a much higher accuracy than that provided by existing solutions. Moreover, by utilizing an existing payment processing network to analyze transaction data and generate reports and alerts, substantial changes to existing payment processing infrastructure may not be required to implement various embodiments of the invention.

Moreover, embodiments of the invention provide a number of business advantages over existing solutions. By providing reports and alerts including transaction volume statistics for different geographic locations and times of day, mobile merchants can set up shop at the locations (and during the times of day) associated with the most profitable opportunities. Further, by providing reports and alerts including fraud statistics for different geographic locations and times of day, mobile merchants can avoid conducting transactions at the locations (and during the times of day) associated with an undesirably high rate of fraud. Merchants must typically absorb the costs associated with fraudulent transactions, and by providing mobile merchants such reports and alerts, the fraud-related losses can be minimized.

In some embodiments, reports and messages may be transmitted to client devices operated by other entities. Such entities may include, for example, acquirers, issuers, processors, payment processing networks, users, data analysts, and any other suitable entity. Consequently, such entities may further appreciate the advantages provided by embodiments of the invention.

IV. Exemplary Portable Consumer Devices and Computer Apparatuses

Figure 12:
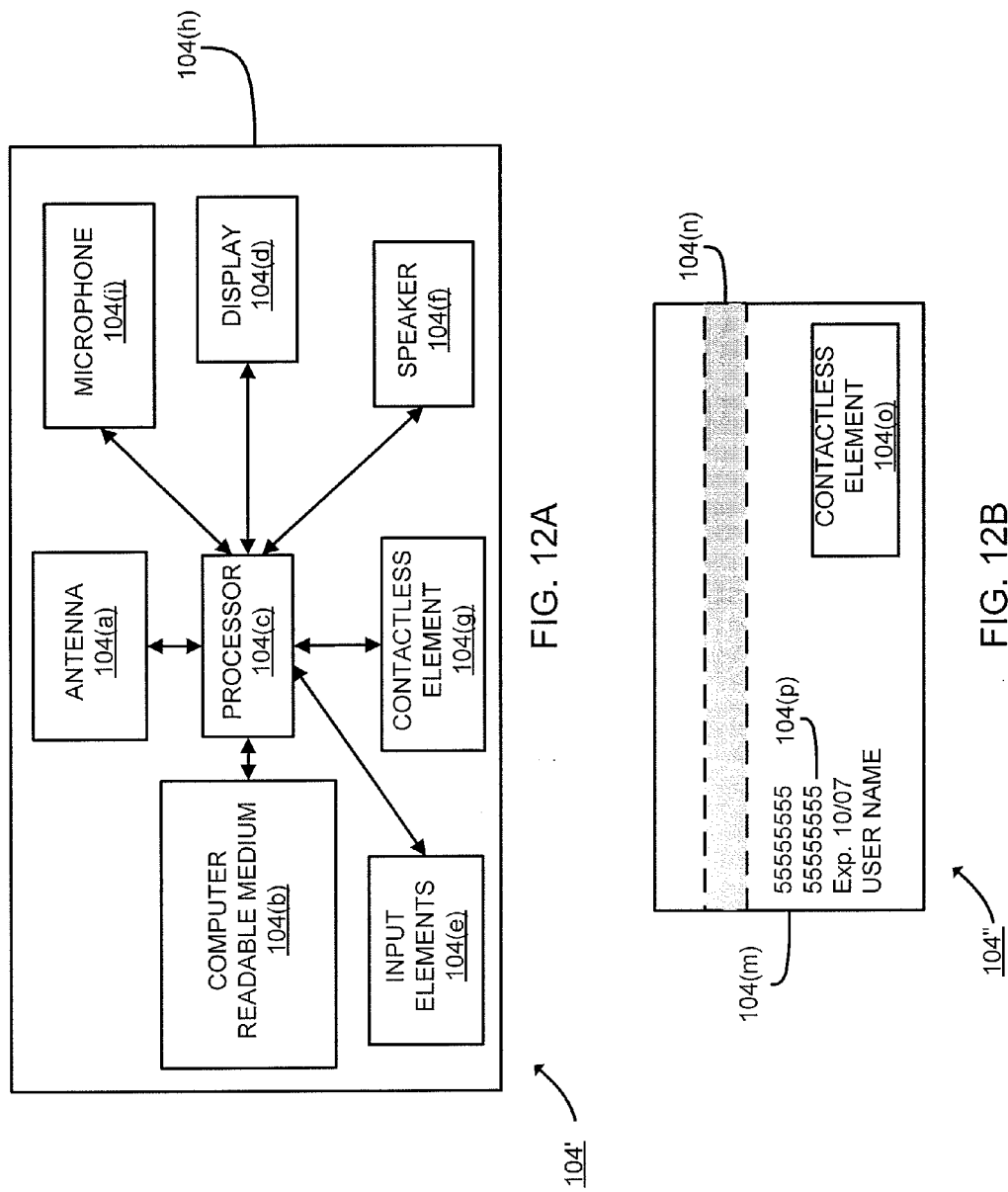
FIGS. 12A-12B show block diagrams of exemplary portable consumer devices according to embodiments of the invention.

FIGS. 12A-12B show block diagrams of exemplary portable consumer devices according to embodiments of the invention.

FIG. 12A shows a block diagram of a phone 112' that can be used in embodiments of the invention. The phone 112' can be both a notification device that can receive alert messages, as well as a portable device that can be used to make payments. The exemplary phone 112' may comprise a computer readable medium 112(*b*) and a body 112(*h*) as shown in FIG. 12A. The computer readable medium 112(*b*) may be in the form of (or may be included in) a memory that stores transaction data (e.g., issuer account numbers, loyalty provider account numbers, etc.) and may be in any suitable form including a magnetic stripe, a memory chip, etc. The memory may store information such as financial information, transit information (e.g., as in a subway or train pass), access information (e.g., as in access badges), etc. Financial information may include information such as bank account information, loyalty account information (e.g., a loyalty account number), an issuing bank identification number (BIN), credit or debit card number information, account balance information, an expiration date, consumer information such as the account holder's name, date of birth, etc. Any of this information may be transmitted by the phone 112'.

In some embodiments, information in the memory may also be in the form of data tracks that are traditionally associated with credit cards. Such tracks may include Track 1 and Track 2. Track 1 ("International Air Transport Association") may store more information than Track 2, and may contain the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

The phone 112' may further include a contactless element 112(*g*), which may be implemented in the form of a semiconductor chip (or other data storage element) with an associated wireless transfer (e.g., data transmission) element, such as an antenna. The contactless element 112(*g*) may be associated with (e.g., embedded within) the phone 112' and data or control instructions transmitted via a cellular network may be applied to the contactless element 112(*g*) by means of a contactless element interface (not shown). The contactless element interface may function to permit the exchange of data and/or control instructions between the mobile device circuitry (and hence the cellular network) and the optional contactless element 112(*g*).

The contactless element 112(*g*) may be capable of transferring and receiving data using a near field communications ("NFC") capability (or near field communications medium) in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 112' and an interrogation device. Thus, the phone 112' may be capable of communicating and transferring data and/or control instructions via both a cellular network and near field communications capability.

The phone 104' may also include a processor 104(c) (e.g., a microprocessor) for processing the functions of the phone 104' and a display 104(d) to allow a consumer to see the phone numbers and other information and messages. The phone 104' may further include input elements 104(e) to allow a user to input information into the device, a speaker 104(f) to allow the user to hear voice communication, music, etc., and a microphone 104(i) to allow the user to transmit her voice through the phone 104'. The phone 104' may also include an antenna 104(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

An example of a portable consumer device 104" in the form of a card is shown in FIG. 12B. FIG. 12B shows a plastic substrate 104(m). A contactless element 104(o) for interfacing with an access device may be present on or embedded within the plastic substrate 104(m). Consumer information 104(p) such as an account number, expiration date, and user name may be printed or embossed on the card. Also, a magnetic stripe 104(n) may also be on the plastic substrate 104(m). The portable consumer device 104" may also comprise a microprocessor and/or memory chips with user data stored in them.

As shown in FIG. 12B, the portable consumer device 104" may include both a magnetic stripe 104(n) and a contactless element 104(o). In other embodiments, both the magnetic stripe 104(n) and the contactless element 104(o) may be in the portable consumer device 104". In other embodiments, either the magnetic stripe 104(n) or the contactless element 104(o) may be present in the portable consumer device 104".

Figure 14:
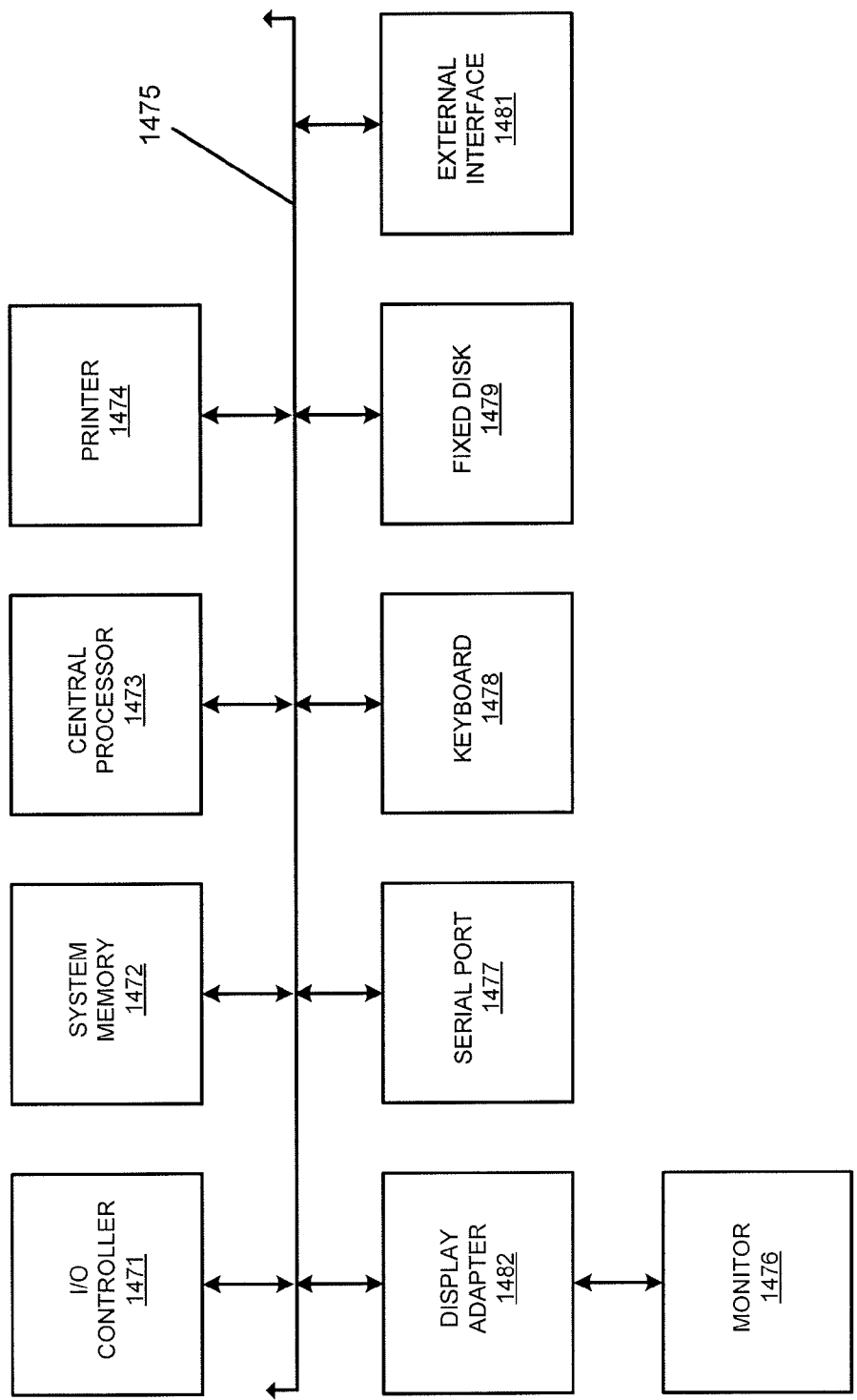
FIG. 14 shows a block diagram of a computer apparatus according to an embodiment of the invention.

FIG. 14 shows a block diagram of a computer apparatus according to an embodiment of the invention.

The various participants and elements may operate one or more computer apparatuses (e.g., server computers) to facilitate the functions described herein, and any of the elements in the figures may use any suitable number of subsystems to facilitate the functions described herein. Examples of such subsystems or components are shown in FIG. 14. The subsystems shown in FIG. 14 are interconnected via a system bus 1475. Additional subsystems such as a printer 1474, keyboard 1478, fixed disk 1479 (or other memory comprising computer readable media), monitor 1476, which is coupled to display adapter 1482, and others are shown. Peripherals and input/output (I/O) devices, which couple to I/O controller 1471, can be connected to the computer system by any number of means known in the art, such as serial port 1477. For example, serial port 1477 or external interface 1481 can be used to connect the computer apparatus to a wide area network such as the Internet, a mouse input device, or a scanner. The interconnection via system bus 1475 may allow the central processor 1473 to communicate with each subsystem and to control the execution of instructions from the system memory 1472 or the fixed disk 1479, as well as the exchange of information between subsystems. The system memory 1472 and/or the fixed disk 1479 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

Some embodiments of the invention may be directed to receiving transaction data for transactions conducted at stationary merchants located at or near various attractions such as sporting events, festivals, etc. This transaction data can be aggregated, and alerts can be sent to enrolled mobile merchants, the alerts identifying the location of the attraction. Thus, mobile merchants may be able to conduct transactions near the attraction, taking advantage of the large number of potential customers attending (or on their way to) the attraction.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   electronically receiving transaction data for one or more transactions conducted at one or more mobile merchants, the transaction data including a location for each of the one or more transactions;
   analyzing, by a server computer, the transaction data, wherein analyzing the transaction data includes determining statistical data for the location included in the transaction data;

generating, by the server computer, a message based on the analysis, wherein the generated message includes the determined statistical data for the location included in the transaction data; and electronically transmitting the message to a client device.

2. The method of claim 1, wherein the client device is associated with a mobile merchant.

3. The method of claim 1, wherein the message includes a report or an alert.

4. The method of claim 1, wherein the determined statistical data for the location includes a determined transaction volume for the location.

5. The method of claim 4, wherein the transaction data further includes a time for each of the one or more transactions, and wherein the determined transaction volume for the location is associated with a time interval.

6. The method of claim 1, wherein at least one of the one or more transactions is a fraudulent transaction.

7. The method of claim 6, wherein the determined statistical data for the location includes a determined fraud rate for the location.

8. The method of claim 1, wherein the transaction data is included in one or more of an authorization request message, an authorization response message, a clearing message, a settlement message, and a chargeback message.

9. The method of claim 1, wherein the server computer is located in a payment processing network configured to process electronic payment transactions and to provide clearing and settlement services.

10. The method of claim 1, wherein the generated message includes a report that lists the determined statistical data for a plurality of locations.

11. The method of claim 1, further comprising:
electronically receiving an authorization request message corresponding to a transaction conducted at a mobile merchant, wherein the authorization request message includes the location, wherein the generated message includes an alert, and wherein the determined statistical data includes a fraud rate for the location.

12. A server computer comprising:
a processor; and
a computer readable medium coupled to the processor, wherein the computer readable medium comprises code executable by the processor for implementing a method comprising:
electronically receiving transaction data for one or more transactions conducted at one or more mobile merchants, the transaction data including a location for each of the one or more transactions;
analyzing, by a server computer, the transaction data, wherein analyzing the transaction data includes determining statistical data for the location included in the transaction data;
generating, by the server computer, a message based on the analysis, wherein the generated message includes the determined statistical data for the location included in the transaction data; and
electronically transmitting the message to a client device.

13. The server computer of claim 12, wherein the client device is associated with a mobile merchant.

14. The server computer of claim 10, wherein the message includes a report or an alert.

15. The server computer of claim 12, wherein the determined statistical data for the location includes a determined transaction volume for the location.

16. The server computer of claim 15, wherein the transaction data further includes a time for each of the one or more transactions, and wherein the determined transaction volume for the location is associated with a time interval.

17. The server computer of claim 12, wherein at least one of the one or more transactions is a fraudulent transaction.

18. The server computer of claim 17, wherein the determined statistical data for the location includes a determined fraud rate for the location, and wherein the generated message includes the fraud rate.

19. The server computer of claim 12, wherein the transaction data is included in one or more of an authorization request message, an authorization response message, a clearing message, a settlement message, and a chargeback message.

20. The server of computer of claim 12, wherein the server computer is located in a payment processing network configured to process electronic payment transactions and to provide clearing and settlement services.

21. A method comprising:
electronically transmitting transaction data for one or more transactions conducted at one or more mobile merchants to a server computer associated with a payment processing network, wherein the transaction data identifies a location for each of the one or more transactions, wherein the server computer analyzes the transaction data, wherein analyzing the transaction data includes determining statistical data for the location included in the transaction data, wherein the server computer generates a message based on the analysis, and wherein the generated message includes the determined statistical data for the location included in the transaction data; and
electronically receiving the message from the server computer at a client device.

22. The method of claim 21, wherein the client device is associated with a mobile merchant.

23. The method of claim 21, wherein the message includes a report or an alert.

24. The method of claim 21, wherein the determined statistical data for the location includes a determined transaction volume for the location.

25. The method of claim 24, wherein the transaction data further includes a time for each of the one or more transactions, and wherein the determined transaction volume for the location is associated with a time interval.

26. The method of claim 21, wherein at least one of the one or more transactions is a fraudulent transaction.

27. The method of claim 26, wherein the determined statistical data for the location includes a determined fraud rate for the location.

28. The method of claim 21, wherein the transaction data is included in one or more of an authorization request message, an authorization response message, a clearing message, a settlement message, and a chargeback message.

29. The method of claim 21, wherein the payment processing network is configured to process electronic payment transactions and to provide clearing and settlement services.

* * * * *